US010630978B2

(12) United States Patent
He et al.

(10) Patent No.: US 10,630,978 B2
(45) Date of Patent: Apr. 21, 2020

(54) METHODS AND DEVICES FOR INTRA-CODING IN VIDEO COMPRESSION

(71) Applicants: BlackBerry Limited, Waterloo (CA); 2236008 Ontario Inc., Waterloo (CA)

(72) Inventors: Dake He, Waterloo (CA); Gaëlle Christine Martin-Cocher, Toronto (CA); David Flynn, Darmstadt (DE)

(73) Assignee: Blackberry Limited, Waterloo, Ontario (CA)

(*) Notice: Subject to any disclaimer, the term of this patent is extended or adjusted under 35 U.S.C. 154(b) by 84 days.

(21) Appl. No.: 15/593,957

(22) Filed: May 12, 2017

(65) Prior Publication Data
US 2018/0332282 A1 Nov. 15, 2018

(51) Int. Cl.
*H04N 19/11* (2014.01)
*H04N 19/184* (2014.01)
*H04N 19/176* (2014.01)
*H04N 19/115* (2014.01)
*H04N 19/91* (2014.01)
*H04N 19/463* (2014.01)

(52) U.S. Cl.
CPC ........... *H04N 19/11* (2014.11); *H04N 19/176* (2014.11); *H04N 19/463* (2014.11)

(58) Field of Classification Search
None
See application file for complete search history.

(56) References Cited

U.S. PATENT DOCUMENTS

| 8,553,769 | B2* | 10/2013 | He | H04N 19/33 |
| | | | | 375/240.12 |
| 9,143,797 | B2* | 9/2015 | He | H04N 19/159 |
| 9,438,923 | B2* | 9/2016 | He | H04N 19/50 |
| 9,591,322 | B2* | 3/2017 | Wang | H04N 19/50 |
| 9,654,785 | B2* | 5/2017 | Chien | H04N 19/176 |
| 2006/0120456 | A1 | 6/2006 | Tasaka et al. | |
| 2008/0007438 | A1* | 1/2008 | Segall | H04N 19/176 |
| | | | | 341/61 |
| 2011/0243229 | A1* | 10/2011 | Kim | H04N 19/176 |
| | | | | 375/240.13 |

(Continued)

OTHER PUBLICATIONS

WIPO, PCT International Search Report and Written Opinion relating to PCT application No. PCT/CA2018/050544, dated Jul. 20, 2018.

(Continued)

*Primary Examiner* — Mohammad J Rahman
(74) *Attorney, Agent, or Firm* — Rowand LLP

(57) ABSTRACT

Methods and devices for video coding using intra-coding and removing redundant intra modes from a set of candidate intra modes. The methods may determine that at least some candidate intra modes generate candidate prediction blocks that are redundant and, based on that determination, eliminate said at least some of the candidate intra modes to reduce the set to a subset. In some cases, a candidate prediction block is redundant if it is less than a threshold different from another of the candidate prediction blocks identified by one of the candidate intra modes in the set. A function may be applied to the candidate prediction block and the another candidate prediction block to identify redundancy.

17 Claims, 8 Drawing Sheets

(56) References Cited

U.S. PATENT DOCUMENTS

| | | | |
|---|---|---|---|
| 2012/0177118 A1* | 7/2012 | Karczewicz | H04N 19/137 375/240.13 |
| 2012/0314766 A1* | 12/2012 | Chien | H04N 19/176 375/240.12 |
| 2013/0022119 A1* | 1/2013 | Chien | H04N 19/159 375/240.16 |
| 2013/0121414 A1* | 5/2013 | Yasugi | H04N 19/176 375/240.12 |
| 2013/0195199 A1* | 8/2013 | Guo | H04N 19/91 375/240.18 |
| 2013/0259128 A1* | 10/2013 | Song | H04N 19/11 375/240.12 |
| 2014/0219349 A1* | 8/2014 | Chien | H04N 19/105 375/240.13 |
| 2014/0233644 A1* | 8/2014 | Lee | H04N 19/176 375/240.12 |
| 2015/0117528 A1* | 4/2015 | Kim | H04N 19/82 375/240.12 |
| 2015/0189283 A1* | 7/2015 | Wang | H04N 19/50 375/240.03 |
| 2016/0309179 A1 | 10/2016 | Schwarz et al. | |
| 2017/0118467 A1* | 4/2017 | Lee | H04N 19/196 |
| 2017/0134733 A1 | 5/2017 | Boon et al. | |
| 2017/0214940 A1* | 7/2017 | Chien | H04N 19/176 |
| 2018/0184123 A1* | 6/2018 | Terada | H04N 19/61 |
| 2018/0205946 A1* | 7/2018 | Zhang | H04N 19/11 |
| 2018/0316913 A1* | 11/2018 | Jun | H04N 19/159 |

OTHER PUBLICATIONS

Wang et al.: "Image quality assessment: from error visibility to structural similarity," IEEE Transactions on Image Processing, pp. 600-612, 2004.

W16359, Requirements for a future video coding standard v3, Geneva, Switzerland: MPEG, 2016.

Seregin et al.: "Variable number of intra modes", Chengdu, China: JVET-D0113, 2016.

Lin et al.: "SPEC Hashing: Similarly Preserving algorithm for Entropy-based Coding," in Proc. CVPR, 2010.

Aaron et al.: "Neflix on future coding," ISO/IEC JTC 1/SC 29/WG11 n35771, Geneva, CH, 2015.

"Dirac Specification" http://wayback.archive/org/web/20150503015104/ http://diracvideo.org/download/specification/dirac-spec-latest.pdf, 2008.

Bhaskaranand et al.: "Distributions of 3D DCT coefficients for video," in Proc. ICASSP, 2009.

He et al.: "Rolling Intra Prediction for Image and Video Coding", Feb. 5, 2016, U.S. Appl. No. 15/016,887.

He et al.: "Methods and Devices for Coding Motion Vectors in Video Compression", Jan. 10, 2017, U.S. Appl. No. 15/402,769.

* cited by examiner

METHODS AND DEVICES FOR INTRA-CODING IN VIDEO COMPRESSION

FIELD

The present application generally relates to video coding and, in particular, methods and systems for improved intra-coding in video coding.

BACKGROUND

Data compression is used in communications and computer networking to store, transmit, and reproduce information efficiently. It finds particular application in the encoding of images, audio and video. Common image compression formats include JPEG, TIFF, and PNG. A newly-developed video coding standard is the ITU-T H.265/HEVC standard. Other video coding formats include the VP8 and VP9 formats developed by Google Inc. Evolutions to all of these standards and formats are under active development.

All of these image and video coding standards and formats are based on predictive coding that create a prediction of data to be coded, then encode the error (often called the residual) in the prediction for transmission to a decoder as a bitstream. The decoder then makes the same prediction and adjusts it by the reconstructed error decoded from the bitstream. The data compression of the error at the encoder often includes a spectral transform of the error to create blocks of transform domain coefficients. This is typically accompanied by lossy quantization. The reverse operations are performed at the decoder to reconstruct the error/residual. Entropy coding (often context-adaptive) is typically used to encode the residual data, plus side information for making the predictions (e.g. intra-coding mode or inter-coding motion vectors), to generate a bitstream for transmission from encoder to decoder or for storage on a storage medium for later decoding. In some cases, the error at the encoder is encoded without using a spectral transform and/or quantization.

In the case of intra-coding, i.e. spatial compensation, the prediction is based on previously-reconstructed nearby pixel data from within the same picture, typically pixels in a neighbouring block. Traditional intra prediction methods are mostly based on the concept of linear displacement (directional prediction). The encoder losslessly encodes the intra-coding mode (i.e. the selected direction from among the plurality of possible directions) for building a prediction block, and the decoder decodes that intra-coding mode information in order to be able to build the same prediction block in the same way.

One of the principal objectives of any proposed change to video coding is to improve the balance between compression and perceptual quality. Because intra-coding modes are to be losslessly encoded, changes to intra-coding mode encoding and decoding focus on improved compression. Any savings in terms of bits for communicating intra-coding modes from encoder to decoder will come from a reduction in the bitrate needed to encode intra-coding modes. It may be advantageous to find a more efficient way to encode intra-coding mode selection.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
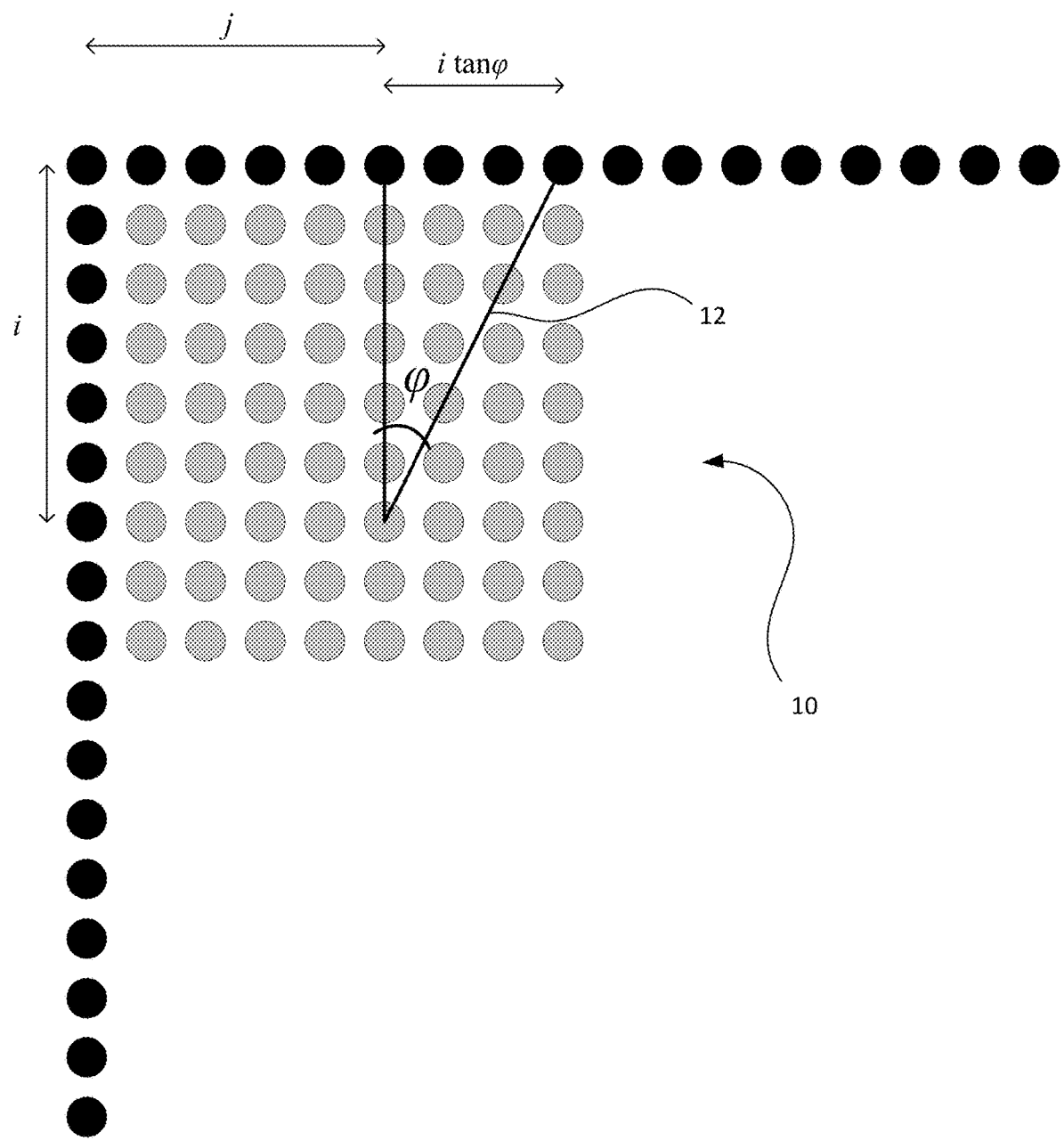
FIG. 1 diagrammatically illustrates an example prediction block generated through intra prediction.

The present application describes methods of encoding and decoding video, and encoders and decoders for encoding and decoding video.

In a first aspect, the present application describes a method of encoding.

In another aspect, the present application describes a method of decoding.

In one aspect, the present application describes a method of encoding a video in a video encoder to produce a bitstream, the video including a current picture containing a current block to be encoded using intra-prediction that employs previously-reconstructed pixels from the current picture. The method includes determining that at least one candidate intra-coding mode in a set of candidate intra-coding modes for the current block would generate a predicted block for the current block that is redundant and, based on that determination, excluding said at least one candidate intra-coding mode from a subset of the candidate intra-coding modes, and wherein said predicted block is determined to be redundant based on applying a function to said predicted block and to another predicted block generated based on one of the other candidate intra-coding modes in the set; selecting, from among the candidate intra-coding modes in the subset, an intra-coding mode to generate a current predicted block for the current block; and entropy encoding the selected intra-coding mode.

In another aspect, the present application describes a method of decoding a video from a bitstream, the video including a current picture containing a current block to be decoded using intra-prediction that employs previously-reconstructed pixels from the current picture. The method includes determining that at least one candidate intra-coding mode in a set of candidate intra-coding modes for the current block would generate a predicted block for the current block that is redundant and, based on that determination, excluding said at least one candidate intra-coding mode from a subset of the candidate intra-coding modes, and wherein said predicted block is determined to be redundant based on applying a function to said predicted block and to another predicted block generated based on one of the other candidate intra-coding modes in the set; entropy decoding, from the bitstream, information regarding a selected intra-coding mode; and identifying, from among the candidate intra-coding modes in the subset, the selected intra-coding mode to generate a current predicted block for the current block based on the information.

In a further aspect, the present application describes encoders and decoders configured to implement such methods of encoding and decoding.

In yet a further aspect, the present application describes non-transitory computer-readable media storing computer-executable program instructions which, when executed, cause one or more processors to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264/AVC standard for video coding, the H.265/HEVC standard, the VP8 format, the VP9 format, or others. Those ordinarily skilled in the art will understand that the present application is not limited to those video coding standards and formats but may be applicable to other video coding/decoding standards and formats, including possible future standards, multi-view coding standards, scalable video coding standards, 3D video coding standards, and reconfigurable video coding standards. Similarly, to the extent that reference is made to particular image coding standards and formats, it will be appreciated that the processes and devices described may be implemented in connection with other standards, including future standards.

In the description that follows, when referring to video the terms frame, picture, slice, tile, quantization group, and rectangular slice group may be used somewhat interchangeably. Those of skill in the art will appreciate that a picture or frame may contain one or more slices or segments. A series of frames/pictures may be called a "sequence" in some cases. Other terms may be used in other video or image coding standards. It will also be appreciated that certain encoding/decoding operations might be performed on a frame-by-frame basis, some are performed on a slice-by-slice basis, some picture-by-picture, some tile-by-tile, and some by rectangular slice group, etc., depending on the particular requirements or terminology of the applicable image or video coding standard. In any particular embodiment, the applicable image or video coding standard may determine whether certain operations described below are performed in connection with frames and/or slices and/or pictures and/or tiles and/or rectangular slice groups, etc., as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment.

Likewise, examples below may refer to a "block", "current block", or "prediction block", in some cases. A "block" in this sense refers to a portion of a picture, such as a coding tree unit, coding unit, prediction unit, transform unit, quantization group, etc., as the case may be. Blocks may be square in many cases, but may be non-square in other cases.

The terms "intra-coding mode" and "intra mode" are used interchangeably in the following description.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Modern image and video coding processes almost all rely upon predictive coding to compress the image data. Block-based predictive coding involves partitioning a picture into a plurality of 2D blocks (often square or rectangular, and possibly of varying sizes) and encoding the data block-by-block. To compress the data, rather than encoding the raw pixel data, a prediction of the block is generated and the difference (termed the error or residual) between the original block and the predicted block is encoded. Encoding typically involves the 2D spectral transform of the residual data, the quantization of the transform coefficients, and the entropy encoding of the quantized transform coefficients in accordance with whatever entropy coding scheme, possibly including binarization, is being used for a given case.

A predicted block is often either created through inter prediction (e.g. relying upon pixel data in a previously-reconstructed picture in a sequence of pictures) or intra prediction (e.g. relying upon nearby previously-reconstructed pixel data in the same picture as the current block). As such, inter prediction aims at exploiting temporal redundancy between pictures, and intra prediction aims at exploiting spatial redundancy within a picture.

In conventional 2D video coding, an original block of pixels may be denoted by x and its prediction denoted by p. The prediction p is generated from previously-reconstructed image data using either intra or inter prediction. Since p is available to both the encoder and the decoder, one can subtract p from x to obtain the residual as follows:

$$e = x - p$$

The residual e is spectrally transformed, quantized and entropy encoded to create a bitstream of encoded video data. At the decoder, the encoded data is entropy decoded to recover the spectrally-transformed, quantized residual, which is then inverse quantized and inverse transformed to reconstruct the residual. The reconstructed block of pixel data is then obtained by adding the reconstructed residual to the predicted block.

To determine how to generate the predicted block, the decoder entropy decodes prediction information. In the case of intra coding, the prediction information may include an intra-coding mode (i.e. prediction direction). In the case of inter coding, the prediction information may include one or more motion vectors.

FIG. 1 diagrammatically shows an example block of predicted pixels (i.e. a predicted block) 10 generated using intra-coding. The pixels of the predicted block 10, shown in light grey, are generated based on previously-reconstructed pixels in neighbouring blocks. The previously-reconstructed pixels are shown in black. A prediction direction 12 is selected, and the prediction direction 12 specifies which neighbouring previously-reconstructed pixel or pixels are the source data for generating a predicted pixel based on the prediction algorithm specified in the applicable video coding protocol.

In many intra-coding schemes, the prediction is based on linear displacement. That is, all predicted pixels are considered as linear displacements at angle φ of previously-reconstructed neighbouring pixels. For example, one of the grey predicted pixels in the 8×8 block is predicted by tracing a line at an angle (φ) from the pixel position to the point where it intersects with either the top row or the left column of black previously-reconstructed pixels. When the intersection falls on integer positions, the value of the black pixel at the intersection is used as the predicted value of the grey pixel; otherwise when the intersection falls at a fractional position between two black pixels, the pixel at the intersection is interpolated by using the two neighbouring dark pixels. In other words, the top row and the left most column may be interpolated to provide pixels at fractional positions for the purpose of generating predicted pixels.

Figure 2:
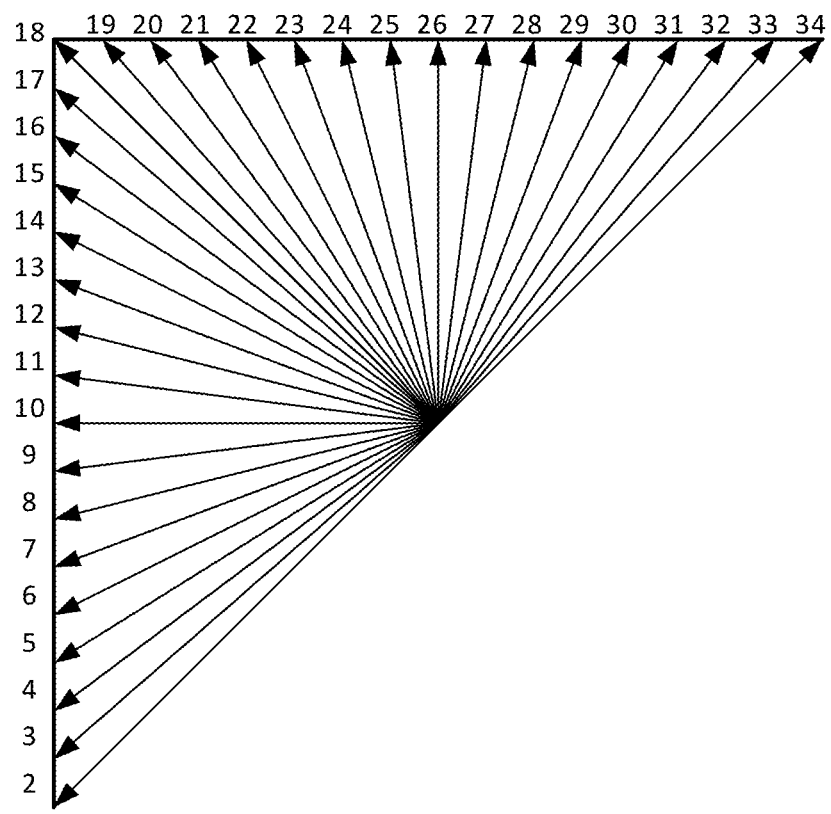
FIG. 2 diagrammatically shows the set of prescribed intra-coding mode directions in HEVC.

FIG. 2 diagrammatically shows the 35 possible intra-coding modes that may be selected in HEVC. Among the 35 intra-coding modes in HEVC, 33 are angular modes: the remaining two modes are the DC mode and the planar mode. The smallest difference in the corresponding angles between two neighbouring angular modes is sometimes referred to as the angular resolution of intra modes or simply intra mode resolution. Future video coding (FVC) standards may increase the number of modes available. Some consideration is being given to having 67 possible intra modes, or more.

The encoder may select an intra-coding mode by evaluating each possible intra-coding mode in the prescribed set of intra-coding modes. The encoder then signals the selected mode to the decoder so that the decoder can reconstruct the same prediction p. The encoder may also need to signal the block size and shape, if it can not be determined by the decoder from context.

In both AVC and HEVC, for a given x an intra prediction mode m may be obtained and coded as follows. Let I denote the set of all available candidate modes. For an 8×8 prediction unit, I contains 35 modes in HEVC. In this example the encoder would:

1. Search for a mode $m_x$ in I such that the rate distortion performance resulting from coding $e = x - p_m$ is minimized, i.e., $$m_x = \mathrm{argmin}_{m \in I}[r_q(e) + r(m) + \lambda d(\hat{e}, e)],$$

where $p_m$ denotes the prediction block generated by using mode m (along with the reconstructed pixels in a neighbourhood of x), e denotes the residual block, $r_q(e)$ denotes the rate in bits resulting from encoding e (possibly involving transformation and quantization), r(m) denotes the rate in bits resulting from encoding mode m, λ denotes the standard Lagrange multiplier, ê denotes the reconstructed residual block, and d(ê, e) denotes a distance between ê and e.

2. Entropy code the mode $m_x$.

In some implementations, the number of available coding modes may change depending upon the block size. That is, for smaller blocks, there may be fewer modes in I. In the above example process, once the size of the prediction unit is determined, then the set of available modes, I, is fixed. Intra modes indicies are coded without loss of information, i.e. without quantization. Accordingly, the signaling of intra-coding modes can occupy a significant portion of the bitstream, particularly as the number of possible modes increases, since it takes additional bits to signal an index if there are a large number of possible modes in the set I.

In some implementations, the encoder and decoder may keep track of the modes being used most often and may build a list of "most-probable modes" (MPMs). This list may be used to find coding efficiencies in signaling the selected intra coding mode by first signaling whether the selected mode is in the MPM list using a dedicated flag and then coding its index in the MPM list (if it is in the list) rather than its index in the full set of I. If the selected mode is not in the MPM list, then the encoder may signal its index in the remainder of the set of I.

As an illustrative example, let x denote the current block, I denote the set of all available candidate modes, and $m_x \in I$ denote the intra mode to be used to generate the prediction for x. Then $m_x$ is encoded as follows by using an MPM list:

1. Based on intra modes of the previously processed blocks neighbouring x, build a list of MPMs, denoted by $L_x$ below for brevity.
2. Check if $m_x \in L_x$, and do the following:
   i. If $m_x \in L_x$, set a binary flag named prev_intra_luma_pred_flag to 1 and encode the flag along with the index of $m_x$ in $L_x$ into the bitstream.
   ii. If $m_x \notin L_x$, set prev_intra_luma_pred_flag to 0 and encode the flag along with the index of $m_x$ in $I \backslash L_x$ into the bitstream.

Correspondingly, $m_x$ is decoded as follows by using an MPM list:

1. Based on intra modes of the previously processed blocks neighbouring x, build a list of MPMs, denoted by $L_x$ below for brevity.
2. Decode prev_intra_luma_pred_flag from the bitstream.
3. If prev_intra_luma_pred_flag is equal to 1, determine $m_x$ by decoding the index of $m_x$ in $L_x$ from the bitstream; otherwise, determine $m_x$ by decoding the index of $m_x$ in $I \backslash L_x$ from the bitstream.

The present applicant has determined that there are often redundancies among the predicted blocks that would be generated by different intra-coding modes. That is, two or more of the candidate intra-coding modes in the set I may result in generating predicted blocks that are redundant. Redundant blocks are blocks that are identical or are so close that they are less than a threshold different from each other. In some cases, redundancy may be identified by applying a function ƒ( ) to each of the predicted blocks. If the resulting output of the function is the same for each block, then the two blocks are redundant. Example functions may include a hash function, quantization, or other simplifying functions.

Let x denote the current block to be coded by using intra coding. Let $M_x \subset I$ denote a set of intra modes. An intra mode' $\in I \backslash M_x$, i.e., m' is a member in I but not in $M_x$, is called a redundant intra mode for x given $M_x$ if there exists an intra mode $m \in M_x$ such that the prediction blocks generated by m' and m are the same.

Let p' denote the prediction block generated by m'. Let ƒ(•) denote a function or mapping that takes a prediction block as an input. Examples of ƒ include hash functions and quantizers. Under ƒ, an intra mode m'∈I\$M_x$ is called a redundant intra mode given $M_x$ if there exists an intra mode $m \in M_x$ such that the prediction block p generated by m satisfies the following equality: ƒ(p')=ƒ(p). m' and m are sometimes called redundant siblings.

Based on the fact that there are redundant blocks generated by two or more intra modes in the set of possible intra modes, in one aspect, the present application proposes to reduce the set by removing one or more redundant intra modes as candidates. In other words, the search set of candidate intra modes is reduced to a search subset of candidate intra modes by eliminating at least some of the redundant intra modes. An intra mode for a current block is then selected from the smaller search subset and is entropy encoded. The decoder performs the same analysis of the candidate intra modes to identify redundant intra modes, thereby realizing the same subset of candidate intra modes. It entropy decodes the selected mode based on its membership in the subset.

In cases where the additional computational complexity due to the redundancy analysis needs to be controlled, a control parameter may be sent from the encoder to the decoder to instruct the decoder on how the analysis is to be done at the decoder. Such a control parameter may indicate what distance metric is to be used, for example. In one implementation, by controlling precision, redundant intra modes may be identified by using simple metrics like Hamming distance on the generated prediction blocks or by matching the Hash values of the generated prediction blocks.

The fact that the intra mode has been selected from a smaller search subset means that it may be entropy encoded more efficiently than an intra mode selected from a larger set, in that the index information sent to the decoder need only distinguish the selected intra mode from the smaller subset of remaining candidates and not from the larger original search set of candidate intra modes. In this sense, the "alphabet" has changed/shrunk, and that change may be exploited in the entropy encoding/decoding to achieve bit savings.

In one implementation, this change in alphabet is exploited directly in the entropy encoding and decoding. That is, the entropy encoding and decoding are dependent upon the determination of the subset of candidate intra-coding modes. In this manner, the entropy coding directly gains savings from the reduced alphabet for signaling the selected intra-coding mode. However, it will be appreciated that this may introduce a computational dependency that links the entropy coding to the reconstruction process. That dependency may be undesirable in some cases, as it may be advantageous to allow the entropy coding to work independently and, at the decoder, fill a buffer with decoded symbols from which the reconstruction process works. Accordingly, in some implementations, as will be further explained later below, the mapping of modes to an ordered list may be separated from the ordered assignment of coding probabilities to positions on that ordered list. That is, the CABAC probabilities (for example) may be in a fixed order for the coding list and the encoder and decoder may entropy code an index within that coding list; however, after having been decoded, the decoder then determines an ordering of the candidate intra-coding modes by moving any redundant intra-coding modes to the end (least probable) portion of the mode mapping list that maps modes to the indices of the coding list. By ensuring only the non-redundant modes are grouped at the most probable end of the list, the encoder and decoder still manage to exploit the reduction in candidate intra modes to save bits in signaling the selected mode.

In an ideal situation, the encoder and decoder would identify redundancy partly by measuring the rate and the distortion as a result of coding x–p and as compared to coding x–p' with a given quantization parameter Qp. If coding x–p results in the same rate and the same distortion as coding x–p' does, then m is considered redundant. Under a more relaxed condition, m is considered redundant if the rate-distortion performance resulting from coding x–p is within a prescribed threshold of that resulting from coding x–p'. However, since x is not available to the decoder, this approach is inapplicable and we need to find another measure of redundancy. Two examples include:

1. m is considered redundant if the distance between p and p' is within a prescribed threshold given by pred_diff_threshold. Note that pred_diff_threshold might depend upon the quantization parameter Qp, that is, it might increase as Qp increases. In some embodiments pred_diff_threshold may be selected by the encoder, coded, and sent to the decoder as part of the bitstream. In some embodiments, pred_diff_threshold may be defined in published specifications. Common distance metrics may be used including, but not limited to, $L_1$, $L_2$, $L_\infty$, MAE, MSE, or SSIM.

2. m is considered redundant if $f(p)=f(p')$, where $f$ is a many-to-one mapping function. Examples of such a mapping function $f$ include, but are not limited to, locality-sensitive hashing, scalar or vector quantization, and dimensionality reduction methods like principle component analysis, autoencoder neural network, etc.

Figure 3:
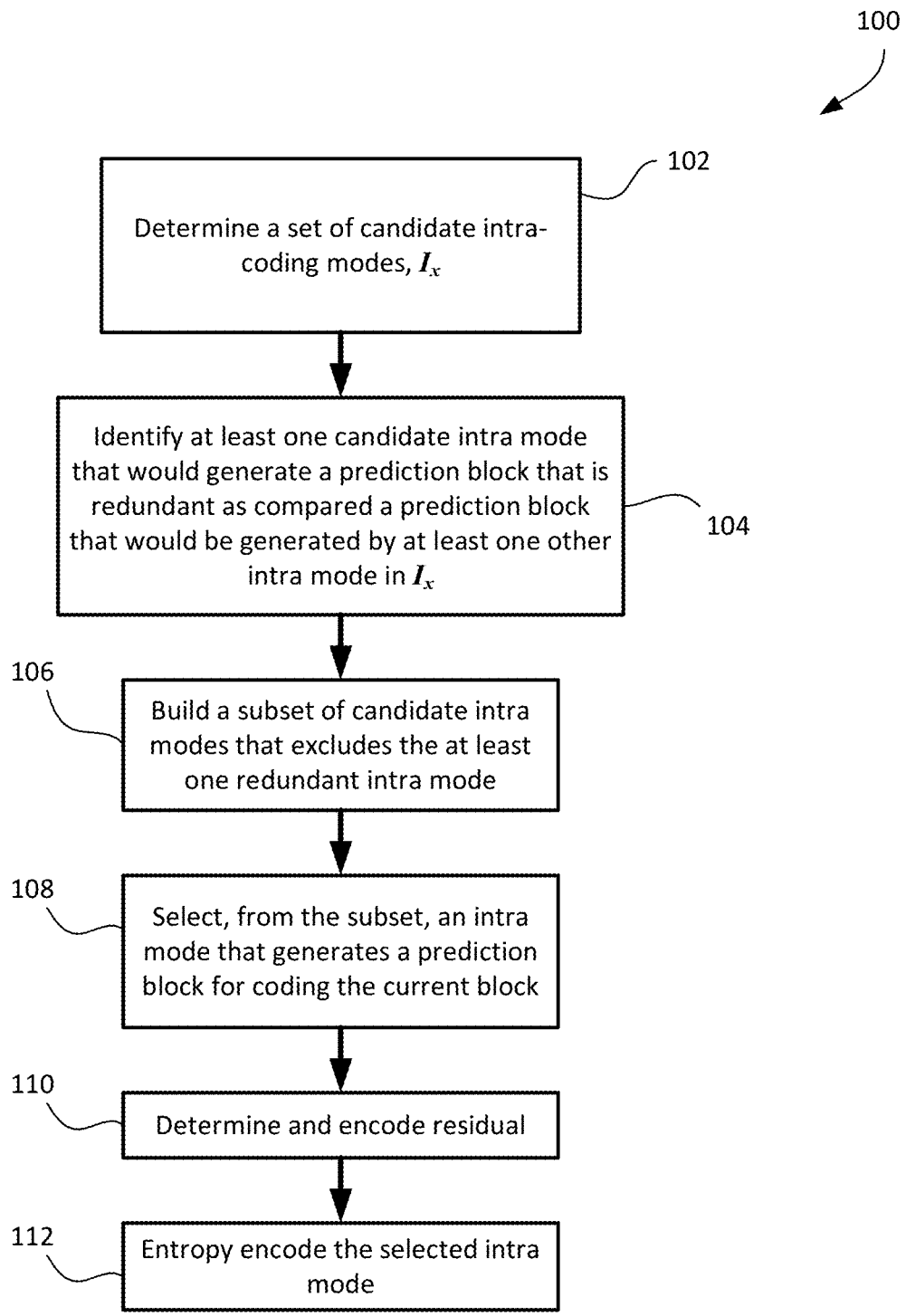
FIG. 3 shows an example method for encoding a selected intra-coding mode in accordance with an embodiment of the present application.

Reference is now made to FIG. 3, which shows an example method 100 for encoding an intra mode in accordance with an embodiment of the present application. The encoder is configured to evaluate candidate intra modes from a set of intra modes $I_x$, as indicated by operation 102. The set of candidate intra modes for the current block x may partly depend on the modes specified by the applicable coding standard or protocol, and may further partly depend on the block size, texture (luma, chroma), block shape, or other such coding parameters.

In operation 104, the encoder identifies that at least one of the candidate intra modes would generate a candidate prediction block that is redundant as compared to a candidate prediction block that would be generated by another candidate intra mode in the set. A candidate intra mode that would generate a redundant block may be referred to as a redundant candidate intra mode. Accordingly, in operation 106, the encoder builds or generates a subset containing candidate intra modes that excludes the at least one redundant candidate intra mode.

The encoder selects an intra mode from the subset of candidate intra modes for generating the prediction block in operation 108. Based on that prediction block and the current block, the encoder determines the residual and encodes it in accordance with the applicable coding scheme, as indicated by operation 110. In many cases, this may include spectrally transforming the residual, quantizing it, and entropy encoding the quantized transform coefficients.

In operation 112, the encoder entropy encodes the selected intra-coding mode. The encoding of the selected intra-coding mode is based upon the alphabet that results from the building of the subset. That is, the encoding exploits the reduced size of the subset as compared to the original search set so as to try to encode the intra mode more efficiently. In one implementation, the entropy encoding is changed or adapted based on the subset that results from reducing the set of candidate intra modes. In other words, the elimination of redundant intra modes changes the probability of those modes to 0, which alters the probabilities associated with other intra modes, thereby changing the entropy encoding. In another implementation, the entropy coding remains the same, i.e. the alphabet for entropy coding is still based on the full set of modes and the indices to that set have their associated probabilities for coding; however, the mapping of modes to those indices/probabilities is adjusted in the reconstruction phase based on the redundancy analysis to group the non-redundant modes in the most probable positions and to move the redundant modes to the least-probable positions.

Figure 4:
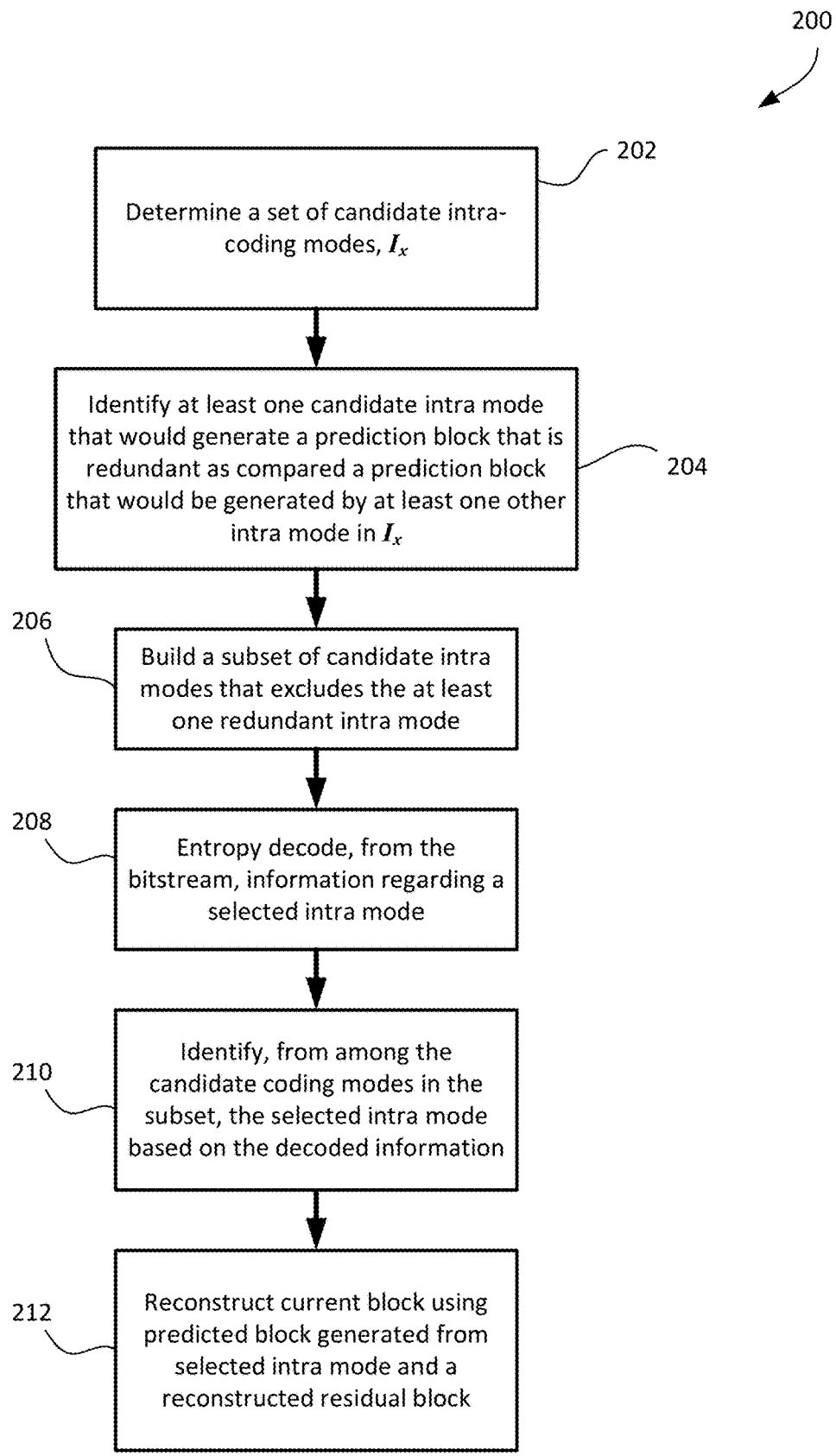
FIG. 4 shows one example method of decoding video and, in particular, a selected intra mode for an intra-coded video picture in accordance with an embodiment of the present application.

Reference is now made to FIG. 4, which shows one example of a method 200 of decoding a video and, in particular, decoding an intra-coding mode for an intra-coded video picture. In operation 202, the decoder then determines the set of candidate intra modes that would have been identified by the encoder based on the applicable coding standard, block size, block texture, block shape, etc., and in operation 204 the decoder uses the same process used by the encoder to identify at least one of the candidate intra modes as a redundant intra mode. It then builds the same subset in operation 206 as was generated by the encoder. It will be appreciated that the decoder does not actually conduct a search for an optimal intra mode within the subset, but it needs the subset in order to decode the selected intra mode from the bitstream since the entropy encoding of that intra mode is based on the subset.

In operation 208 the decoder entropy decodes information regarding the selected intra mode from the bitstream. In some implementations, the decoded information may be an index or other such pointer to the selected intra mode. In operation 210, the decoder identifies the selected intra mode based on the information decoded from the bitstream. As discussed elsewhere herein, the index may be an index within the subset in some implementations, or may be an index to a coding mode list in some other implementations, where the coding mode list is then mapped to an ordered list based on the subset identified in operation 206. In either case, in operation 210, the selected intra mode is identified.

The decoder then reconstructs the current block in operation 212 by generating the predicted block specified by the selected intra mode and adding it to a reconstructed residual.

Below are simplified examples to help illustrate the difference between coding an index to the subset of coding modes versus coding an index to an ordered list of indices having associated probabilities that is then mapped to an ordered list of coding modes that is based on the subset. In the conventional case, where there is no elimination of redundant modes, assume a given set of coding modes A, B, C, D. They may be put in an ordered list [A, B, C, D]. Each mode is identified by its position (index) in the ordered list (0, 1, 2, or 3), such that to signal selection of mode C, the encoder encodes the index 2.

In the case of direct coding of the index to the subset, assume that B has been identified as redundant, such that the subset of coding modes is now A, C, D. They may be put in an ordered list as [A, C, D]. The alphabet of symbols required to signal selection of one of the modes is now reduced to (0, 1, 2). To signal section of, for example, mode C, the encoder encodes the index 1. The reduction in the size of the alphabet for signaling the selected mode may lead to reduced bits to code the selection in the entropy coding process. However, as explained above this means that at the decoder the redundancy analysis must be complete before entropy decoding of the index since the entropy decoder will need to know the alphabet in order to decode the symbol correctly.

To keep entropy coding and reconstruction separate, rather than reducing the alphabet, the encoder and decoder may change the mapping of modes to positions in the ordered list based on the redundancy analysis, where the positions (indices) have associated static probabilities. In this example, assume the higher probabilities are associated with the beginning of the ordered list and the lower probabilities are associated with the end of the ordered list. In this simplified example, having identified B as redundant, the encoder may create an ordered list mapping modes to indices as [A, C, D, B]. The encoder then encodes index 1 to signal selection of mode C, where the probability of index 2 is possibly higher than the probability associated with index 2 and index 3, thereby saving bits in the entropy coding process.

Figure 5:
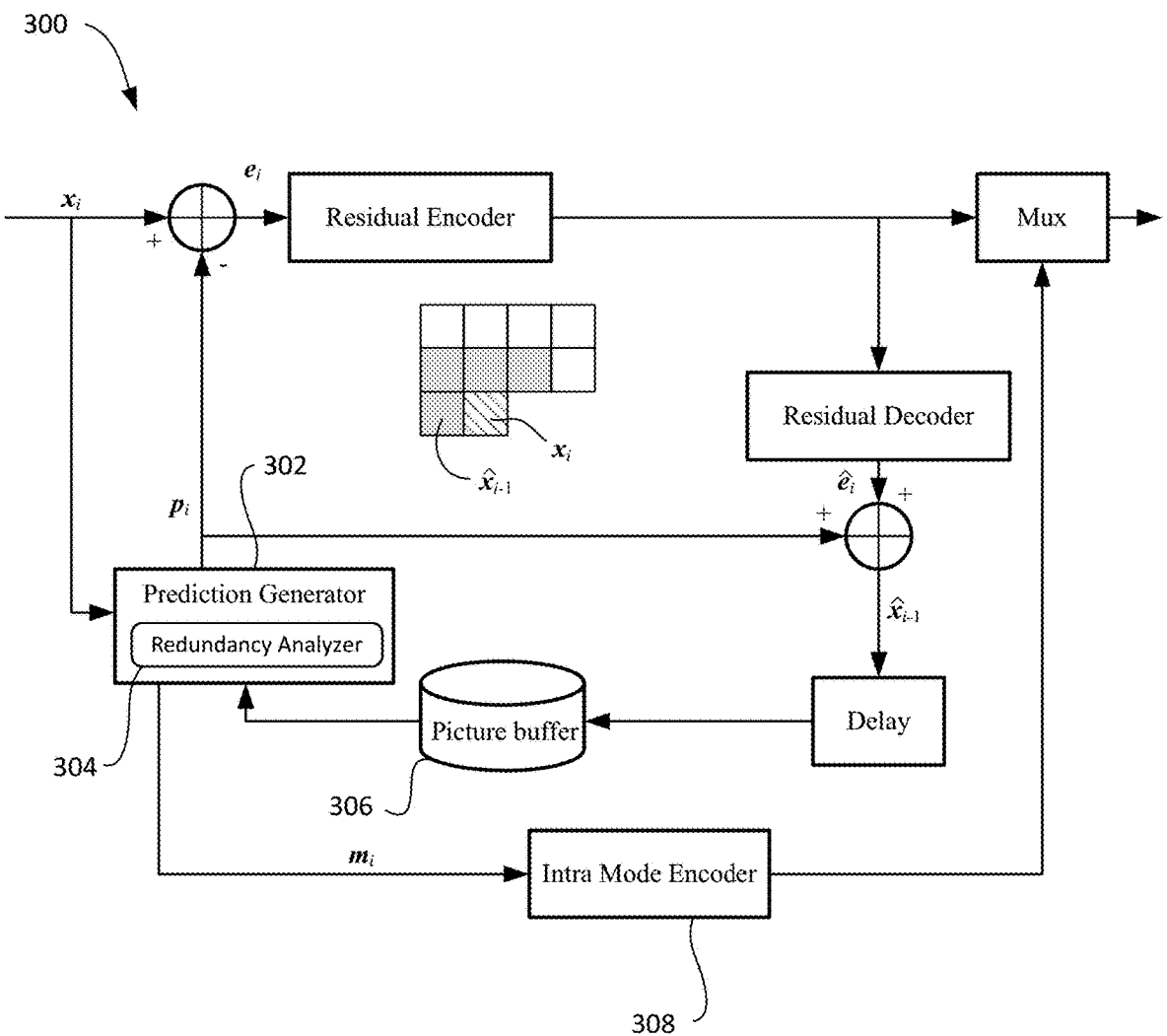
FIG. 5 shows a block diagram of one example of a video encoder.

Reference is now made to FIG. 5, which shows, in block diagram form, one example of a video encoder 300 in accordance with an aspect of the present application. In this example, the video encoder 300 includes the usual prediction feedback loop and a picture buffer 306 storing previously-reconstructed pictures (inter coding) and previously-reconstructed blocks of the current picture (intra coding) that have been encoded and then decoded in the feedback loop. For a current block $x_i$, a prediction generator 302 selects an intra mode (i.e. prediction direction) $m_i$ and generates the predicted block $p_i$, using the pixels of previously-reconstructed blocks $\hat{x}_{i-1}$ in accordance with the selected intra mode. The predicted block $p_i$ is subtracted from the original block x, to obtain the residual block $e_i$. The residual block $e_i$ is then transformed, quantized and encoded.

The prediction generator 302 includes a redundancy analyzer 304 to evaluate the set $I_x$ of candidate intra modes and to generate a subset $M_x$ that excludes at least one redundant intra mode. The redundancy analyzer 304 may use any suitable measure of redundancy, examples of which are described above. The prediction generator 302 then selects the desired intra mode from the subset $M_x$ using rate-distortion optimization or any other suitable selection criteria. The selected intra mode is communicated to an intra mode encoder 308, which losslessly encodes the selected intra mode and the encoded data is combined with encoded residual data to be output as part of a bitstream of encoded video data.

Figure 6:
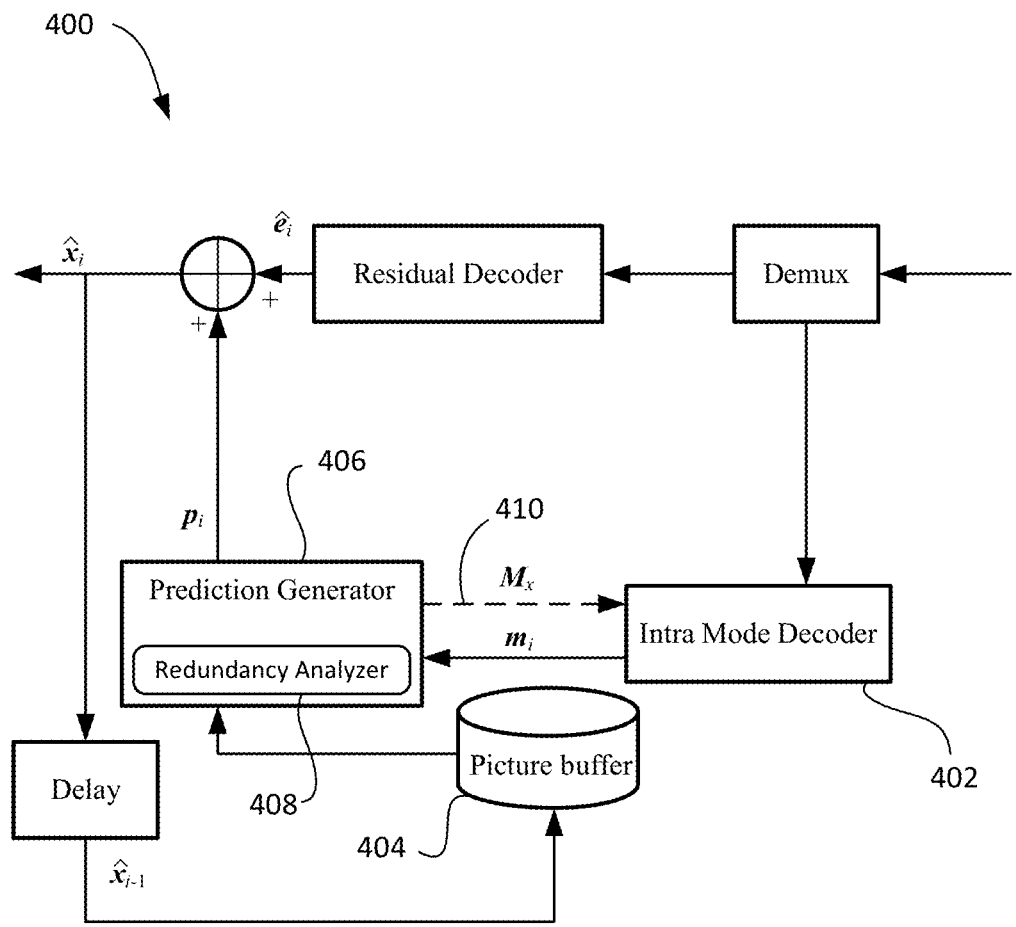
FIG. 6 shows a block diagram of one example of a video decoder.

Reference is now also made to FIG. 6, which shows, in block diagram form, an example video decoder 400 in accordance with an aspect of the present application. The video decoder 400 includes an intra mode decoder 402 to entropy decode the mode information for a block of a current picture that it is reconstructing. It provides the decoded intra mode $m_i$ to a prediction generator 406. The prediction generator 406 also has access to previously-reconstructed pixel data from the picture buffer 404. The prediction generator 406 includes a redundancy analyzer 408 to evaluate the set $I_x$ of candidate intra modes and to generate a subset $M_x$ that excludes at least one redundant intra mode. The redundancy analyzer 408 may use any suitable measure of redundancy, examples of which are described above. Based on the subset $M_x$ identified by the redundancy analyzer 408 and the decoded selected intra mode information from the intra mode decoder 402, the prediction generator 406 is able to determine the selected intra mode and generate the predicted block $p_i$ for reconstructing the video block $\hat{x}_i$. In an embodiment in which the entropy coding is directly dependent upon the alphabet determined by the subset $M_x$, the prediction generator 406 supplies information regarding the subset $M_x$ to the intra mode decoder 402 as indicated by reference number 410.

It will be appreciated that in these examples both the encoder and the decoder include redundancy analyzers to perform the same operation of building a subset by identifying redundant intra-coding modes in the full set of candidate intra modes for the current block, and excluding the redundant modes. To build such a subset, in one example, the redundancy analyzers start by adding candidate intra modes to the subset if they are not redundant vis-à-vis any intra modes already in the subset. An example of such a process is outlined below.

In this example embodiment, let x denote a current block to be encoded or reconstructed, and let $I_x$ denote the set of candidate intra modes for x.

1. If $I_x$ not already ordered, convert $I_x$ into an ordered set $\{m_0, m_1, \ldots, m_{K-1}\}$, where K denotes the number of intra modes in $I_x$. Note such conversion might be implicit by assuming a traversing order in $I_x$. In VP8, K is up to 10; in AVC, K is up to 9; in HEVC, K is up to 35; and for FVC, K might be up to 67. In all cases, the actual value of K for a particular block x may depend upon the size of x and whether x is a luma or a chroma block.

2. Initialize $M_x^{(0)}=\{m_0\}$. Let j denote a counter and initialize j=1.
3. Determine the prediction block $p_j$ generated by intra mode $m_j$ according to the definition of $m_j$.
4. Search in $M_x^{(j-1)}$ for an intra mode m with prediction p such that $f(p)=f(p_j)$. If no such mode exists in $M_x^{(j-1)}$, set $M_x^{(j)}=M_x^{(j-1)}\cup\{m_j\}$, i.e., $M_x^{(j)}$ is obtained by inserting $m_j$ into $M_x^{(j-1)}$; otherwise set $M_x^{(j)}=M_x^{(j-1)}$ since $m_j$ is determined to be redundant.
5. Increment j by 1.
6. Repeat Steps 3 to 5 until j=K−1.

At the end of the above process, the analyser outputs $M_x=M_x^{(K-1)}$ as the set of candidate intra modes for use in intra mode coding for x. Note that $M_x$ is a subset of $I_x$ and does not contain any redundant intra modes.

In some embodiments, the above process may terminate under different conditions. For example, instead of terminating when j=K−1 in Step 6, the above process may terminate when the cardinality of $M_x^{(j-1)}$ or the number of intra modes in $M_x^{(j-1)}$ is greater than a threshold. In yet another example, the above process may terminate when j is greater than a threshold that is less than K−1.

In another aspect, the evaluation of the candidate intra modes in the set may not be a full evaluation of each intra mode against all other modes in the set. For example, the analysis may only test some of the intra modes against members of the subset to see if they are redundant. For example, the subset $M_x^{(0)}$ may be initialized to contain some of the intra modes prior to beginning testing for redundancy. As an example, the initial set of intra modes added to the subset may include those modes in an MPM list.

In some other example implementation, the redundancy analyzer may work with an MPM list in other ways. Three examples include:

1. In one example, the intra mode analyser and the MPM list generator may operate separately (in parallel if so preferred). Specifically, the integrated solution works as follows:
   A. Apply the intra mode analyser as describe above to obtain $M_x$.
   B. Generate an MPM list $L_x$ by using the mode information from previously reconstructed blocks neighbouring x.
   C. Generate an updated MPM list $L_x'=L_x\cap M_x$. Note that in the case where $L_x\cap M_x$ is small and may be noisy, a default set, e.g. $L_x$, may be used to counter the effect of noise.
   D. Encode or decode $m_x$ as if $m_x$ is a member in $M_x$ by using the MPM list $L_x'$ or $M_x\backslash L_x'$, where for any two discrete sets A and B, A\B consists of members in A but not in B.
2. In another example, the intra mode analyser may be applied to both I (to obtain $M_x$) and $L_x$ (to obtain $L_x'$).
3. In yet another example, the intra mode analyser may be applied to only $L_x$ (to obtain $L_x'$), but not I to save computational complexity. In this case, the solution encodes or decodes $m_x$ as if $m_x$ is a member in $I\backslash L_x'$ by using the MPM list $L_x'$.

In yet another implementation, the complexity of the analysis may be reduced by not testing candidate intra modes against all members of the subset; rather, a candidate intra mode is evaluated for redundancy against only some of the intra modes in the subset. It may be noted that two similarly angled intra modes may be more likely to yield the same prediction than two more distantly angled intra modes. In one illustrative example, a candidate intra mode may be evaluated for redundancy against the two adjacent (or neighbouring) modes in terms of angles. If one or both of those modes is not in the subset (because they were determined to be redundant already or have not be tested yet), then in some implementations the candidate intra mode may be evaluated for redundancy against the two nearest neighbouring modes. The candidate intra mode may also be evaluated for redundancy against the DC and planar modes. In general terms, in some embodiments the candidate intra mode may be evaluated for redundancy against one or more intra modes in the subset, but fewer than all of the intra modes in the subset.

Adaptive Intra Mode Resolution

It will be appreciated that the above-described analysis of intra mode redundancy provides insight into the degree to which intra mode resolution is wasted on specifying redundant prediction blocks. Accordingly, in another aspect, the present application proposes that the encoder and decoder could implement adaptive intra mode resolution determination based on redundancy analysis. Advantageously, this avoids having to signal changes in intra mode resolution since the same analysis of the set of candidate intra modes may be carried out by the decoder to determine the resolution used by the encoder to signal selected intra modes. From one perspective, adjusting intra mode resolution is equivalent to selecting a predefined subset of I. As such, the solution in this section can be regarded as a coarser tool than the solution described above. Further note that using predefined subsets of I may be advantageous in that the resulting solution might be less complex than the full solution.

In one example, a list of subsets $I_0 I_1 \ldots I_s$ of I is known to both the encoder and decoder, and the subset are such that $I_0 \subset I_1 \subset I_2 \subset \ldots \subset I_{s-1} \subset I_s$, where $I_s=I$ and s is a positive integer. Please note that the list $I_0 I_1 \ldots I_s$ might be different from $M_z^{(0)} M_x^{(1)} \ldots$ in the example described above. In addition, the intra mode resolution in $I_j$ increases as j increases. In some other examples, $I_0 I_1 \ldots I_s$ may simply be distinct subsets of I, i.e., they may not be nested and satisfy the partial ordering above.

With $I_0 I_1 \ldots I_s$, redundancy analysis is used to determine which $I_j$ is to be used as the alphabet in encoding and decoding the intra mode for the current block. In one embodiment, the determination of $I_j$ is done at both the encoder and the decoder to avoid overhead incurred by signaling $I_j$ or its index in the bitstream. In another embodiment, $I_j$ is determined at the encoder and (or its index) is signaled to the decoder in the bitstream. In yet another embodiment, a set $I_j$ is determined at both the encoder and the decoder. And the encoder has the choice to correct the selection to another set $I_k$, where k≠j, by signalling $I_j$ or its index in the bitstream. Note that in this case, the decision about whether $I_j$ is to be accepted or not needs to be signaled to the decoder in the bitstream.

One way to construct $I_0 I_1 \ldots I_s$ is to incrementally increase the angular resolution from $I_j$ as j increases from 0 to s. For example, $I_0$ might include only the horizontal mode and the vertical mode in addition to the DC mode in HEVC and possibly other non-angular modes (e.g. the planar mode); and $I_s$ includes all available intra modes.

Another way to construct $I_0 I_1 \ldots I_s$ is to partition all intra modes into s+1 sets, start $I_0$ with modes in the first set, and $I_j$ includes modes in the first j+1 sets, where j=0, 1, . . . , s.

For example, intra modes may be classified into one of the following four classes: non-angular, vertical, horizontal, and diagonal, where the non-angular classes consists of modes like the DC mode and the planar mode; the vertical class consists of angular modes whose prediction angles are around 90-degree from the x-axis (horizontal), the horizontal class consists of angular modes whose prediction angles are around 0-degree or 180-degree from the x-axis, and the diagonal class consists of the angular modes that are not in the vertical or the horizontal classes.

Control Parameters

In some applications, like mobile video, the computational complexity incurred by redundancy analysis of intra modes may be a concern. To address such concerns, in some embodiments flags and/or parameters may be used that are intended to signal to a decoder what level of complexity of redundancy analysis is used for a given video, picture, or portion thereof.

For example, one flag may be inserted in the sequence, the picture, the slice, or the coding unit parameter set to indicate whether the redundancy analyzer is to be enabled or disabled for the sequence, the picture, or the slice, etc., respectively.

In another example, when the full redundancy analyzer search is enabled and used, parameters may be inserted in the sequence, the picture, the slice, or the (largest) coding unit parameter set to specify search parameters. Below is an example showing that such a flag, named enable_intra_mode_analyser_flag, is included the picture parameter set to enable or disable the redundancy analyser for a picture in a video sequence:

```
pic_parameter_set_rbsp( ) {
...
enable_intra_mode_analyser_flag
...
}
```

When the redundancy analyzer is enabled and used, parameters may be inserted in the sequence, the picture, the slice, or the (largest) coding unit parameter set to control the search for the current sequence, picture, slice, or (largest) coding unit respectively. Examples of such parameters include the number of intra modes in $M_x^{(j-1)}$ to be checked, what modes in $M_x^{(j-1)}$ are to be checked (e.g. parameters defining a small neighbourhood of $m_j$ in $M_x^{(j-1)}$, and the selection of function $f$.

Additional Embodiments

Instead of removing redundant intra modes, an alternative embodiment is to add processing steps that may be used to make such an intra mode no longer redundant. For example, each mode may be associated with a list of multiple, distinct versions of prediction blocks. Once an intra mode is to found to be redundant with the first version of the prediction block, then a search may be performed to find a version of the prediction block in the stored list that makes the intra mode not redundant. Note that to avoid impacting the MPM list and for increased stability, the search may be initialized to start with the MPM modes. To make sure that the encoder and the decoder find the same version of the prediction block, the list may be ordered in a way that is known both to the encoder and the decoder, or the encoder and the decoder follow a same, predetermined protocol in performing the search.

As an example of generating multiple, distinct versions of prediction blocks for a given intra mode, different smoothing filters may be applied, e.g. filters with different coefficients or even different types of filters (linear, nonlinear, IIR, FIR), to filter reference samples, or the prediction direction angle may be adjusted by using a small step size in order to obtain a different prediction block.

It will also be recalled that exploiting bitrate savings in entropy coding directly through using the smaller alphabet resulting from identifying the subset of intra modes comes at a cost of creating a dependency in the entropy decoding process upon previously reconstructed samples since the entropy decoder needs to know $M_x$. To break such a dependency, an alternative solution may choose to pay a small coding cost.

For example, suppose that the redundancy analyzer determines that $I_j$ in $I_0 I_1 \ldots I_s$ is to be used for the current block x. The index j may be coded by using an entropy encoder and sent to the decoder as part of the bitstream to remove the above mentioned entropy decoding dependency. In some example implementations, index j may alternatively (or also) be predicted from neighbouring blocks.

In another example, the capability of signaling any mode in I may be retained; however, a mode mapping list may be introduced that orders the modes, keeping redundant modes at the end of the list. The encoder then signals the index of the selected mode into this list. CABAC probabilities are configured such as to decrease to 0 for indices near the end of the list. The ordering of the mapping list could further be ordered not just by duplicate count, but by likelihood and distance between modes. Specifically, let d (m, m') denote the distance between two modes, m and m' in I, that is defined by d(m, m')=dist(p,p'), where p and p' denote the prediction blocks generated by using m and m', respectively, and dist denote the distance between p and p' measured by metrics like $L_1$, $L_2$, $L_\infty$, MAE, MSE, or SSIM. Without losing generality, the mode mapping list will reorder I into an ordered set $\{m_0, \ldots, m_{K-1}\}$ such that d[j] decreases as j increases, where d[0]=0, and d[j]=min$\{d(m_j, m_i); 0 \le i < j\}$ for all j=1, . . . , K-1.

It will further be appreciated that the concept and the definition of redundant intra modes can be readily extended to spatial prediction for 3D cuboids, and to other syntax elements such as smoothing filter selection and/or coefficients, and/or partition modes that are used to generate prediction in intra coding.

Figure 7:
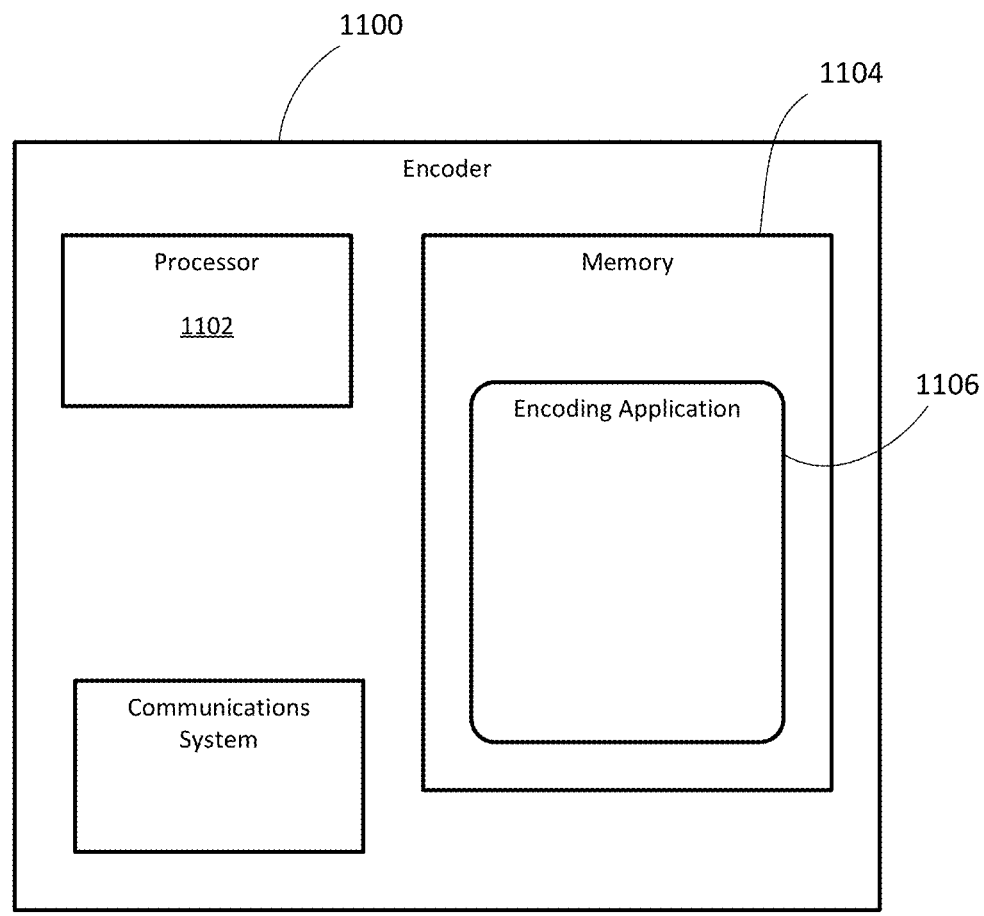
FIG. 7 shows an example simplified block diagram of an encoder.

Reference is now made to FIG. 7, which shows a simplified block diagram of an example embodiment of an encoder 1100. The encoder 1100 includes a processor 1102, memory 1104, and an encoding application 1106. The encoding application 1106 may include a computer program or application stored in memory 1104 and containing instructions that, when executed, cause the processor 1102 to perform operations such as those described herein. For example, the encoding application 1106 may encode and output bitstreams encoded in accordance with the processes described herein. It will be understood that the encoding application 1106 may be stored on a non-transitory computer-readable medium, such as a compact disc, flash memory device, random access memory, hard drive, etc. When the instructions are executed, the processor 1102 carries out the operations and functions specified in the instructions so as to operate as a special-purpose processor that implements the described process(es). Such a processor may be referred to as a "processor circuit" or "processor circuitry" in some examples.

Figure 8:
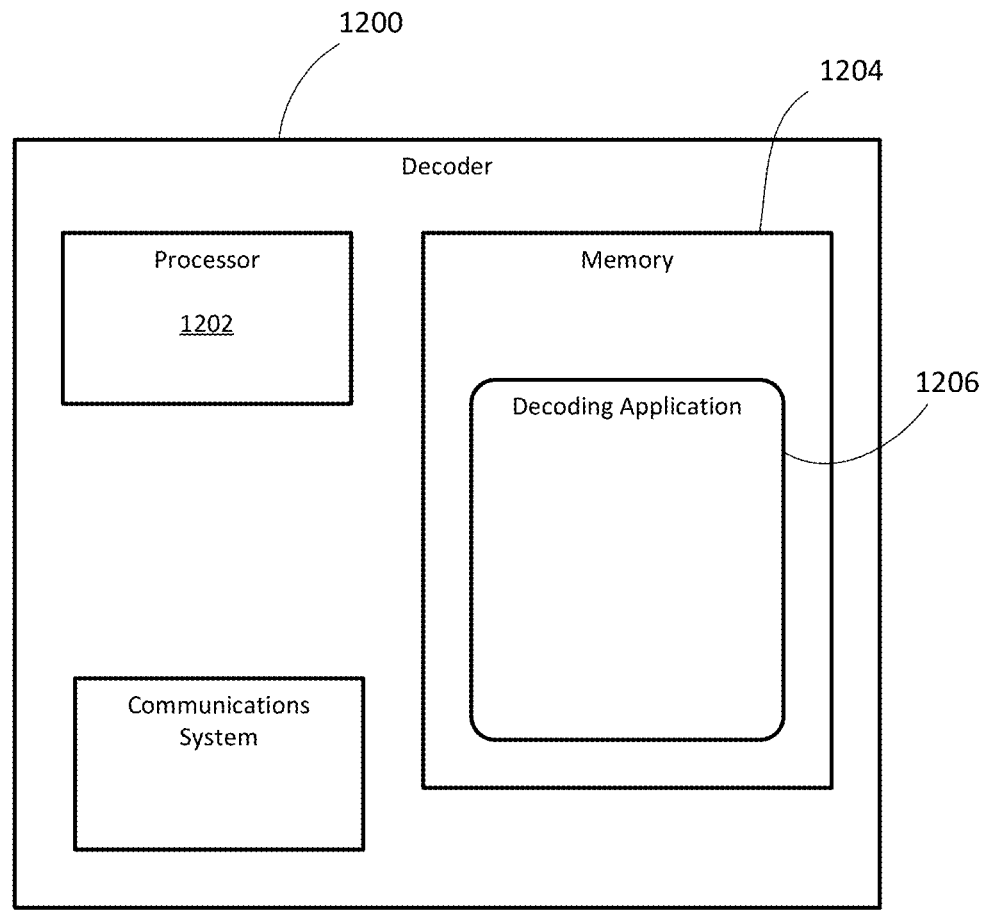
FIG. 8 shows an example simplified block diagram of a decoder.

Reference is now also made to FIG. 8, which shows a simplified block diagram of an example embodiment of a decoder 1200. The decoder 1200 includes a processor 1202, a memory 1204, and a decoding application 1206. The decoding application 1206 may include a computer program or application stored in memory 1204 and containing instructions that, when executed, cause the processor 1202 to perform operations such as those described herein. It will be understood that the decoding application 1206 may be stored on a computer-readable medium, such as a compact disc, flash memory device, random access memory, hard drive, etc. When the instructions are executed, the processor 1202 carries out the operations and functions specified in the instructions so as to operate as a special-purpose processor that implements the described process(es). Such a processor may be referred to as a "processor circuit" or "processor circuitry" in some examples.

It will be appreciated that the decoder and/or encoder according to the present application may be implemented in a number of computing devices, including, without limitation, servers, suitably-programmed general purpose computers, audio/video encoding and playback devices, set-top television boxes, television broadcast equipment, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder or decoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding a video from a bitstream, the video including a current picture containing a current block to be decoded using intra-prediction that employs previously-reconstructed pixels from the current picture, the method comprising:
    determining that at least one candidate intra-coding mode in a set of different candidate intra-coding modes for the current block would generate a predicted block for the current block that is redundant and, based on that determination, excluding said at least one candidate intra-coding mode from a subset of the candidate intra-coding modes, and wherein said predicted block is determined to be redundant based on
        applying a function to said predicted block and to another predicted block generated based on one of the other candidate intra-coding modes in the set;
    entropy decoding, from the bitstream, information regarding a selected intra-coding mode; and
    identifying, from among the candidate intra-coding modes in the subset, the selected intra-coding mode to generate a current predicted block for the current block based on the information,
    wherein determining that at least one candidate intra-coding mode in the set of different candidate intra-coding modes for the current block would generate a predicted block for the current block that is redundant comprises:
        for each candidate intra-coding mode in the set, in turn,
            determining a candidate predicted block that would be generated by that candidate intra-coding mode;
            comparing the candidate predicted block to candidate predicted blocks that would be generated by at least one of the intra-coding modes already in the subset to determine if the candidate predicted block is redundant;
            if so, excluding that candidate intra-coding mode from the subset; and
            if not, adding that candidate intra-coding mode to the subset.

2. The method claimed in claim 1, wherein applying a function comprises computing a distance between said predicted block and said another predicted block by using a metric selected from $L_1$, $L_2$, $L_\infty$, mean absolute error, mean squared error, or structural similarity.

3. The method claimed in claim 1, wherein the function comprises one of a locality-sensitive hashing, a scalar quantization, a vector quantization, a principle component analysis, or an auto-encoder neural network.

4. The method claimed in claim 1, wherein determining that at least one candidate intra-coding mode in the set of different candidate intra-coding modes for the current block would generate a predicted block for the current block that is redundant further comprises:
    initializing the subset by adding at least one of the candidate intra-coding modes from the set to the subset.

5. The method claimed in claim 4, wherein the at least one of the candidate intra-coding modes added to the subset comprises the intra-coding modes in a most probable mode list.

6. The method claimed in claim 1, wherein entropy decoding the selected intra-coding mode comprises entropy decoding the selected intra-coding mode based on a reduced alphabet given by the subset.

7. The method claimed in claim 1, further comprising ordering the intra-coding modes of the set based on redundancy and mapping the ordered intra-coding modes to a coding list having an ordered set of positions, each position having an associated probability, and wherein entropy decoding the information regarding the selected intra-coding mode comprises entropy decoding the information signaling an index to a position in the coding list.

8. A decoder for decoding a video from a bitstream, the video including a current picture containing a current block to be decoded using intra-prediction that employs previously-reconstructed pixels from the current picture, the decoder comprising:
    a processor;
    memory; and
    a decoding application containing instructions executable by the processor that, when executed, cause the processor to:
        determine that at least one candidate intra-coding mode in a set of different candidate intra-coding modes for the current block would generate a predicted block for the current block that is redundant and, based on that determination, exclude said at least one candidate intra-coding mode from a subset of the candidate intra-coding modes, and wherein said predicted block is determined to be redundant based on applying a function to said predicted block and to another predicted block generated based on one of the other candidate intra-coding modes in the set;

entropy decode, from the bitstream, information regarding a selected intra-coding mode; and identify, from among the candidate intra-coding modes in the subset, the selected intra-coding mode to generate a current predicted block for the current block based on the information, wherein the instructions, when executed, are to cause the processor to determine that at least one candidate intra-coding mode in the set of different candidate intra-coding modes for the current block would generate a predicted block for the current block that is redundant by:

for each candidate intra-coding mode in the set, in turn,
determining a candidate predicted block that would be generated by that candidate intra-coding mode;
comparing the candidate predicted block to candidate predicted blocks that would be generated by at least one of the intra-coding modes already in the subset to determine if the candidate predicted block is redundant;
if so, excluding that candidate intra-coding mode from the subset; and
if not, adding that candidate intra-coding mode to the subset.

9. The decoder claimed in claim 8, wherein applying a function comprises computing a distance between said predicted block and said another predicted block by using a metric selected from $L_1$, $L_2$, $L_\infty$, mean absolute error, mean squared error, or structural similarity.

10. The decoder claimed in claim 8, wherein the function comprises one of a locality-sensitive hashing, a scalar quantization, a vector quantization, a principle component analysis, or an auto-encoder neural network.

11. The decoder claimed in claim 8, wherein the instructions, when executed, are to further cause the processor to determine that at least one candidate intra-coding mode in the set of different candidate intra-coding modes for the current block would generate a predicted block for the current block that is redundant by:
initializing the subset by adding at least one of the candidate intra-coding modes from the set to the subset.

12. The decoder claimed in claim 11, wherein the at least one of the candidate intra-coding modes added to the subset comprises the intra-coding modes in a most probable mode list.

13. The decoder claimed in claim 8, wherein the instructions, when executed, are to cause the processor to entropy decode the selected intra-coding mode by entropy decoding the selected intra-coding mode based on a reduced alphabet given by the subset.

14. The decoder claimed in claim 8, wherein the instructions, when executed, further cause the processor to order the intra-coding modes of the set based on redundancy and to map the ordered intra-coding modes to a coding list having an ordered set of positions, each position having an associated probability, and cause the processor to entropy decode the information regarding the selected intra-coding mode by entropy decoding the information signaling an index to a position in the coding list.

15. A non-transitory processor-readable medium storing processor-executable instructions for decoding a video from a bitstream of encoded data, the video a current picture containing a current block to be decoded using intra-prediction that employs previously-reconstructed pixels from the current picture, wherein the processor-executable instructions, when executed by a processor in a video decoder, cause the processor to:

determine that at least one candidate intra-coding mode in a set of different candidate intra-coding modes for the current block would generate a predicted block for the current block that is redundant and, based on that determination, exclude said at least one candidate intra-coding mode from a subset of the candidate intra-coding modes, and wherein said predicted block is determined to be redundant based on
applying a function to said predicted block and to another predicted block generated based on one of the other candidate intra-coding modes in the set;

entropy decode, from the bitstream, information regarding a selected intra-coding mode; and identify, from among the candidate intra-coding modes in the subset, the selected intra-coding mode to generate a current predicted block for the current block based on the information, wherein the instructions, when executed, are to cause the processor to determine that at least one candidate intra-coding mode in the set of different candidate intra-coding modes for the current block would generate a predicted block for the current block that is redundant by:

for each candidate intra-coding mode in the set, in turn,
determining a candidate predicted block that would be generated by that candidate intra-coding mode;
comparing the candidate predicted block to candidate predicted blocks that would be generated by at least one of the intra-coding modes already in the subset to determine if the candidate predicted block is redundant;
if so, excluding that candidate intra-coding mode from the subset; and
if not, adding that candidate intra-coding mode to the subset.

16. The non-transitory processor-readable medium claimed in claim 15, wherein the instructions, when executed, are to further cause the processor to determine that at least one candidate intra-coding mode in the set of different candidate intra-coding modes for the current block would generate a predicted block for the current block that is redundant by:
initializing the subset by adding at least one of the candidate intra-coding modes from the set to the subset.

17. The non-transitory processor-readable medium claimed in claim 15, wherein the instructions, when executed, are to cause the processor to entropy decode the selected intra-coding mode by entropy decoding the selected intra-coding mode based on a reduced alphabet given by the subset.

* * * * *